(12) United States Patent
Tucker

(10) Patent No.: US 10,395,159 B1
(45) Date of Patent: Aug. 27, 2019

(54) UNIT LOAD DEVICE TRACKING TAG

(71) Applicant: ACL Airshop, LLC, Easley, SC (US)

(72) Inventor: Wesley James Tucker, Greenville, SC (US)

(73) Assignee: ACL Airshop, LLC, Easley, SC (US)

( * ) Notice: Subject to any disclaimer, the term of this patent is extended or adjusted under 35 U.S.C. 154(b) by 0 days.

(21) Appl. No.: 15/917,996

(22) Filed: Mar. 12, 2018

(51) Int. Cl.
*G06K 19/06* (2006.01)
*G06K 19/077* (2006.01)

(52) U.S. Cl.
CPC ................. *G06K 19/0776* (2013.01)

(58) Field of Classification Search
USPC .......................................... 235/451, 492, 385
See application file for complete search history.

(56) References Cited

U.S. PATENT DOCUMENTS

| | | | | |
|---|---|---|---|---|
| 8,322,955 B2* | 12/2012 | Arnesen | ........... | G06K 19/07749 248/346.02 |
| 9,092,680 B2* | 7/2015 | Ferguson | ........... | G06K 19/0717 |
| 2005/0237184 A1* | 10/2005 | Muirhead | ........... | B29C 47/0019 340/539.13 |
| 2006/0038077 A1* | 2/2006 | Olin | ........... | B64D 9/00 244/137.1 |
| 2007/0119926 A1* | 5/2007 | Sloan | ........... | G06K 7/10445 235/384 |
| 2007/0232101 A1* | 10/2007 | Hudson | ........... | B64D 11/0696 439/157 |
| 2008/0122610 A1* | 5/2008 | Muirhead | ........... | B65D 19/0016 340/505 |
| 2010/0288843 A1* | 11/2010 | Arnesen | ........... | G06K 19/07749 235/492 |
| 2017/0045394 A1* | 2/2017 | Fuss | ........... | B64D 9/00 |
| 2017/0262668 A1* | 9/2017 | Lim | ........... | H04W 4/80 |

* cited by examiner

*Primary Examiner* — Tuyen K Vo
(74) *Attorney, Agent, or Firm* — Dority & Manning, P.A.

(57) ABSTRACT

A unit load device tracking tag includes a base with a plurality of studs. The plurality of studs of the base is configured such that the plurality of studs of the base is receivable within an aircraft seat track. A tag housing is mounted to the base. A tag is positioned within the tag housing. The tag is operable to transmit one or more signals to a tag reader. The unit load device tracking tag also includes features for locking the base to the aircraft seat track such that the plurality of studs of the base do not slide within the aircraft seat track.

18 Claims, 5 Drawing Sheets

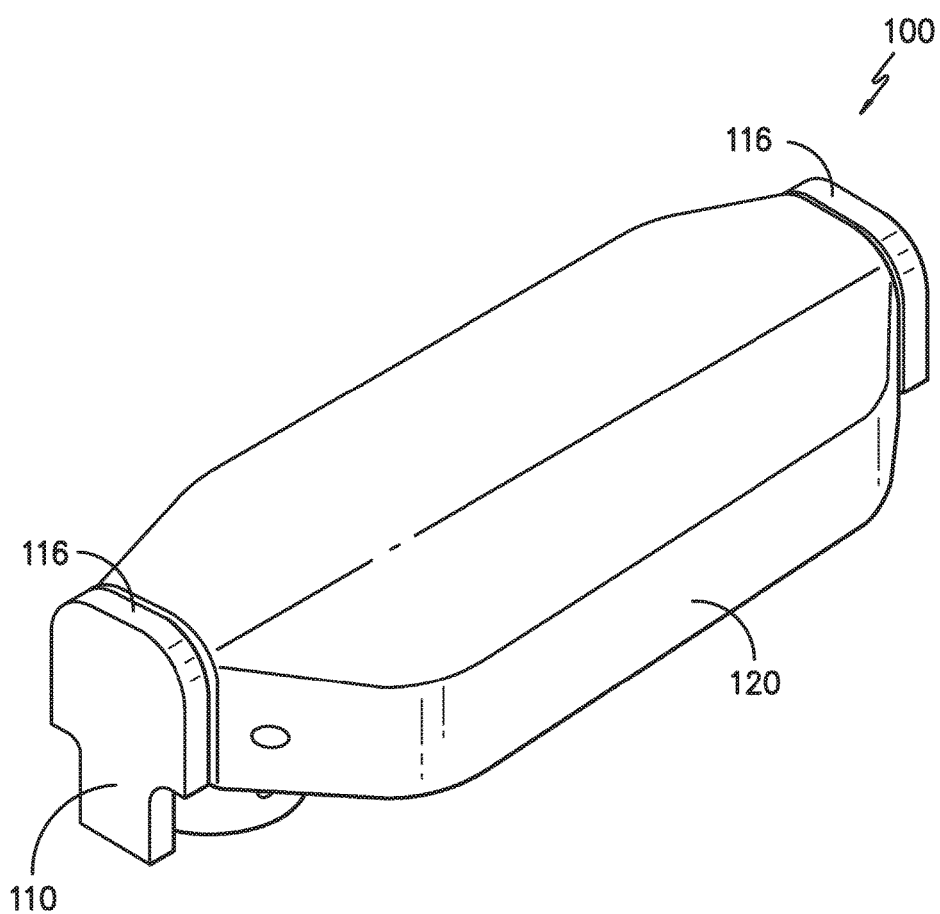
FIG. -1-

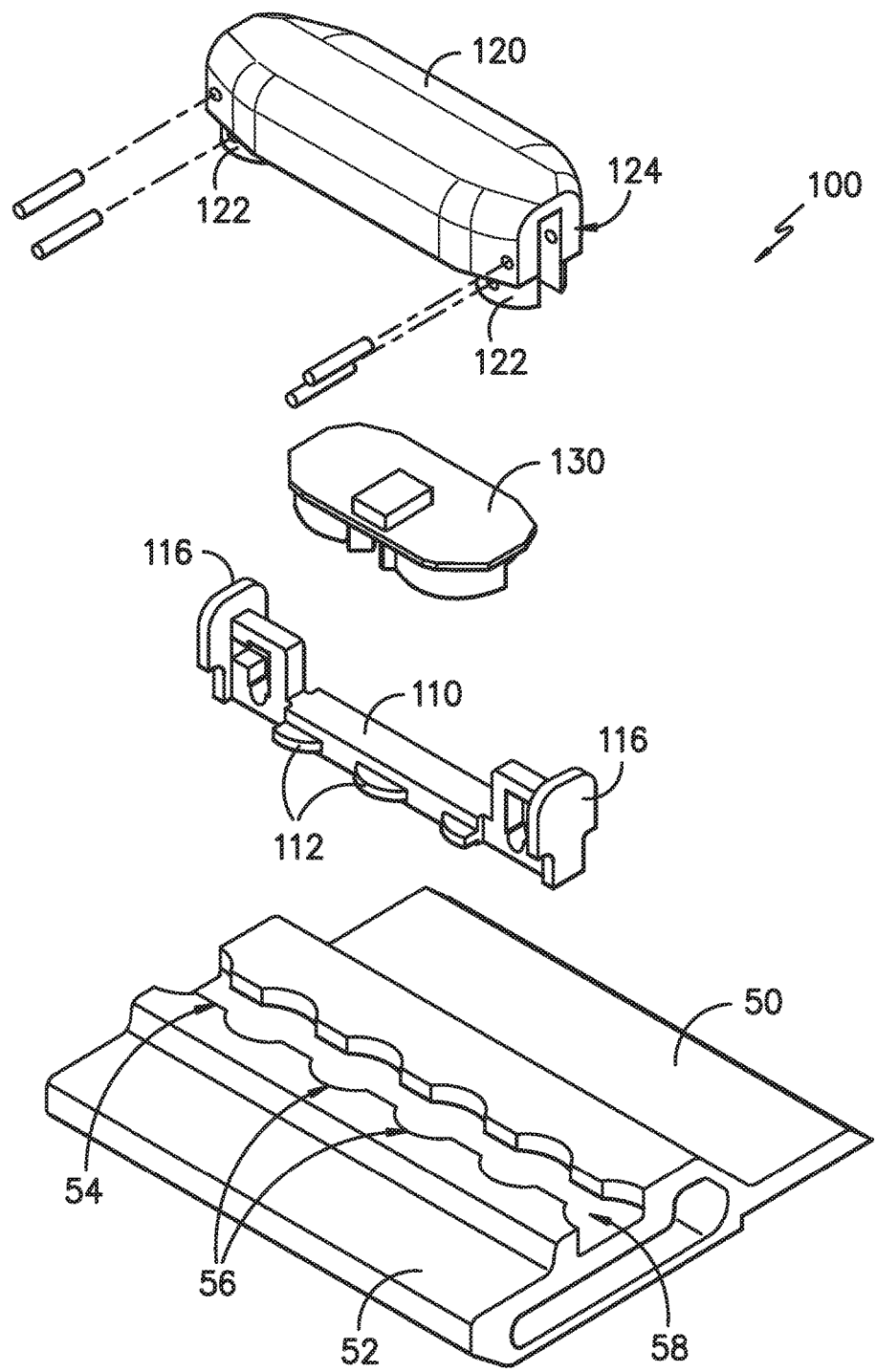
FIG. -2-

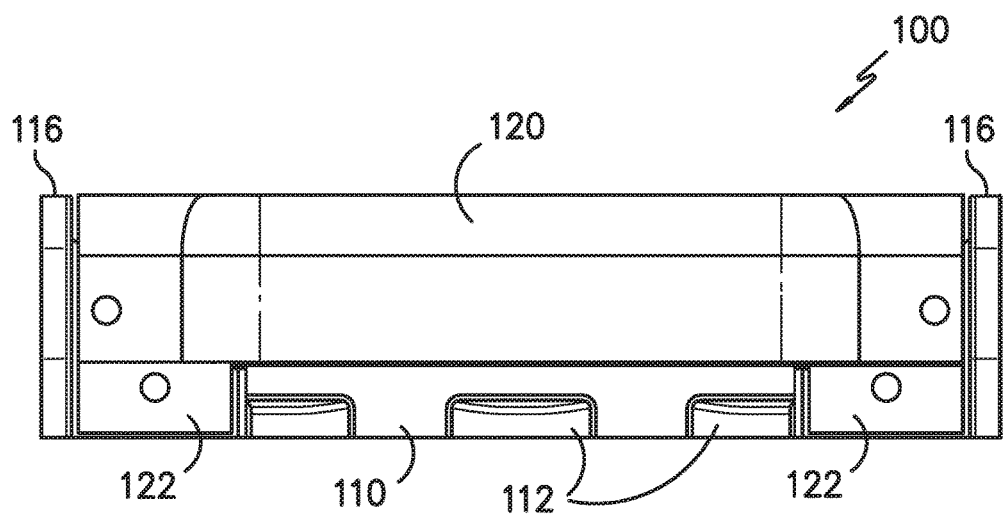
FIG. -3-
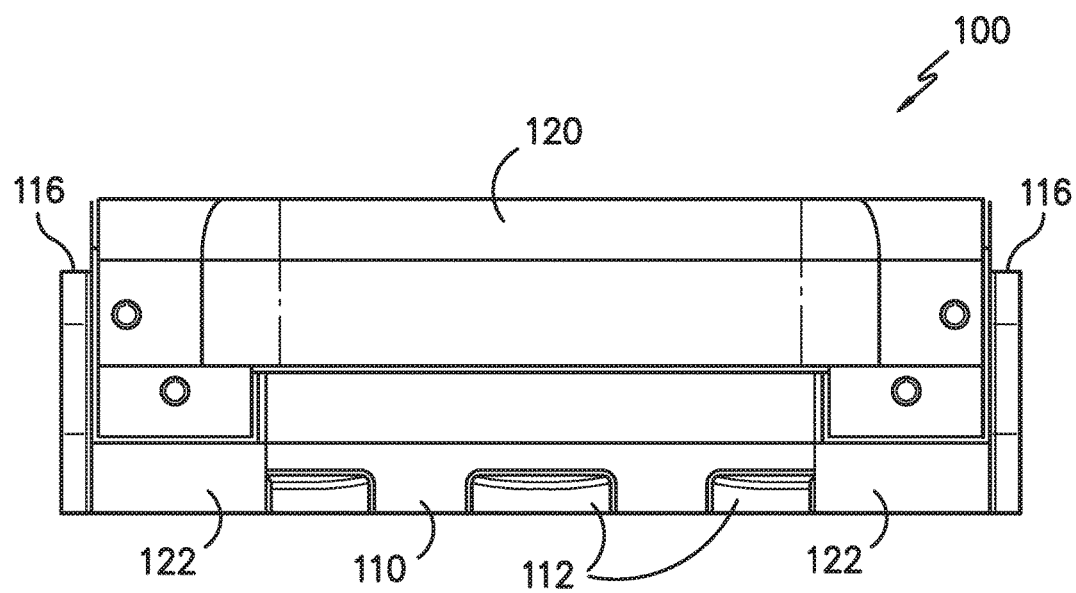
FIG. -4-

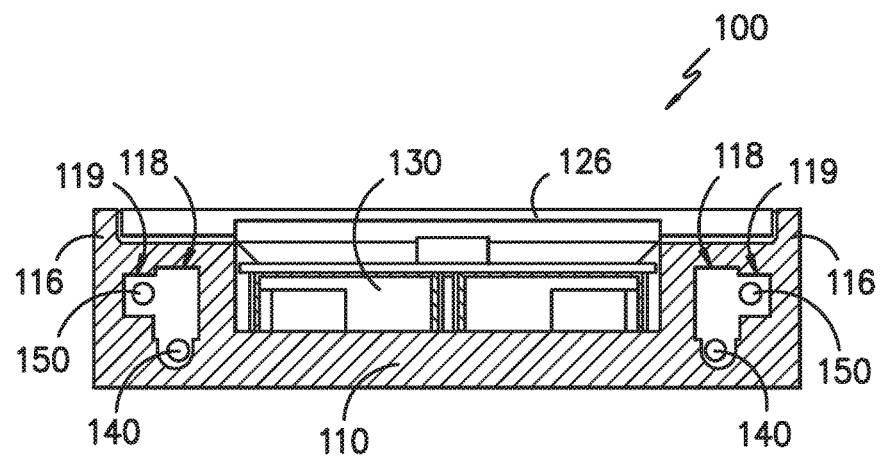
FIG. -5-
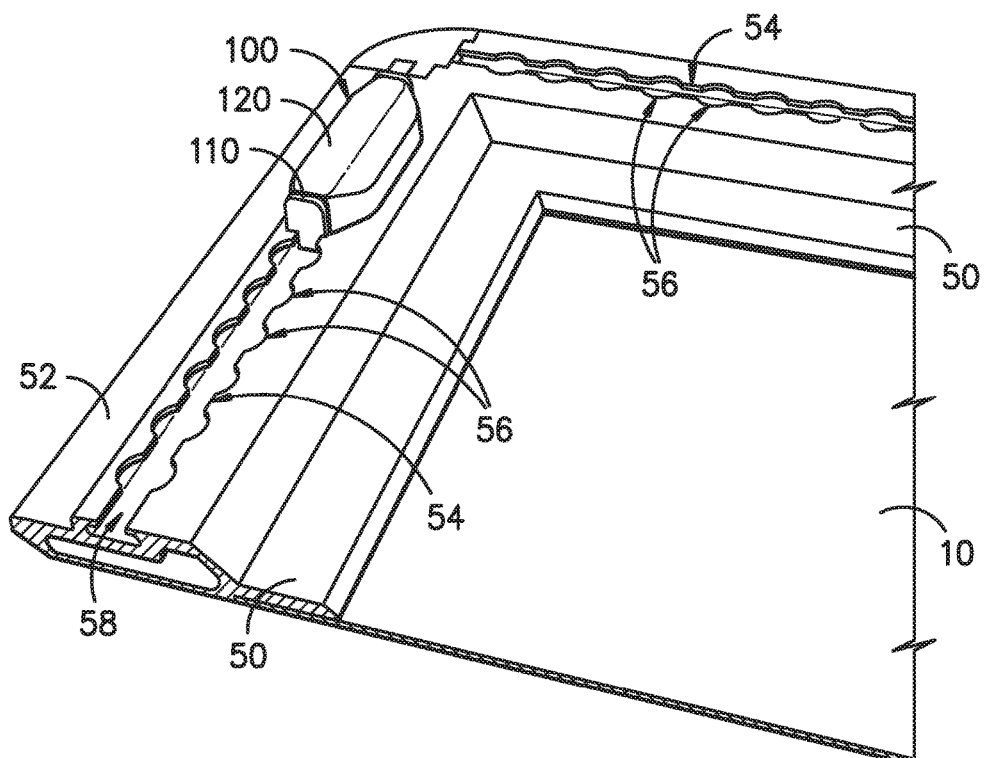
FIG. -6-

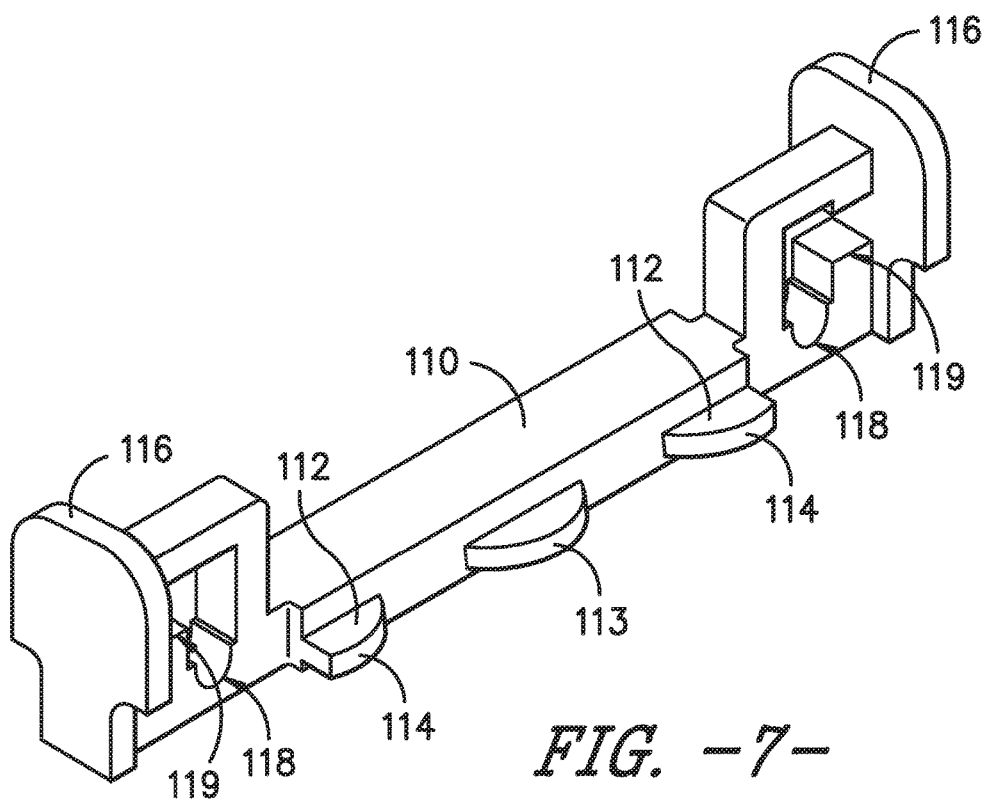
FIG. -7-
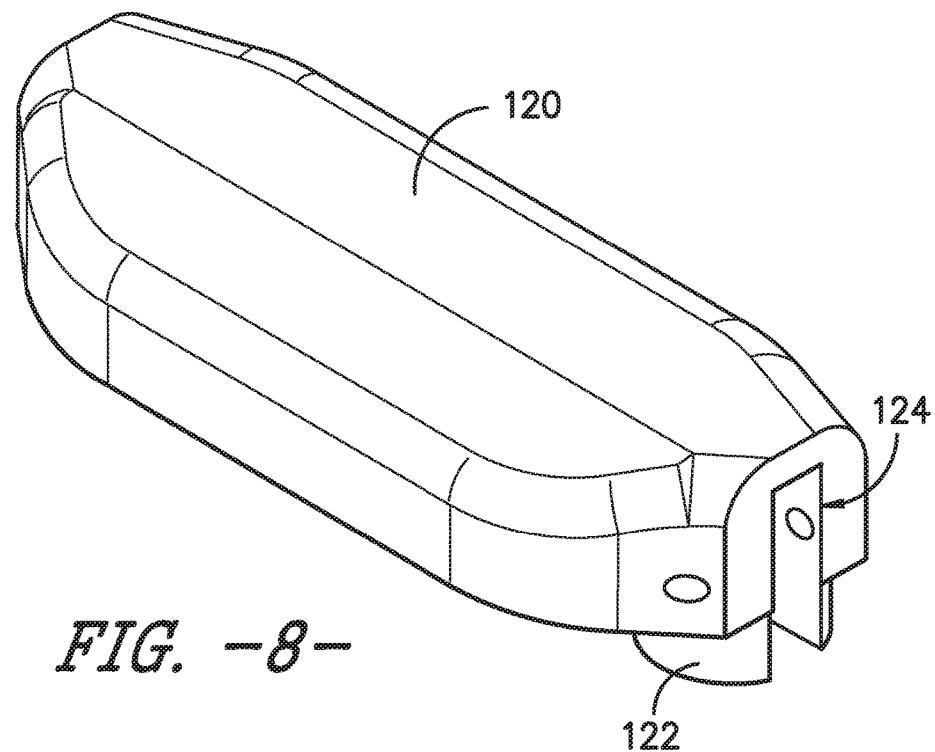
FIG. -8-

UNIT LOAD DEVICE TRACKING TAG

FIELD OF THE INVENTION

The present subject matter relates generally to tags for air cargo unit load devices, such as pallets.

BACKGROUND OF THE INVENTION

Pallets and other unit load devices are commonly used to support cargo within aircraft. Certain pallets are flat sheets of aluminum. Cargo may be stacked on the aluminum sheets, and netting, ropes or cables may be used to secure the cargo on the pallets. Pallets allow large quantities of cargo to be bundled onto the pallets and more easily loaded and unloaded from aircraft. The pallets can also facilitate cargo storage within aircraft.

Tracking pallets as aircraft travel between destinations can be difficult. Recently, pallets have been tagged to make tracking easier. However, known tags suffer drawbacks. For example, certain tags require each tag to be individually fastened to a respective pallet. Thus, an installer may be required to drive multiple self-tapping screws through the tag into the pallet. This process is time-consuming and tedious. In addition, the labor required to install the tag can significantly increase tracking costs.

BRIEF DESCRIPTION OF THE INVENTION

The present subject matter provides a unit load device tracking tag with a base having a plurality of studs. The plurality of studs of the base is configured such that the plurality of studs of the base is receivable within an aircraft seat track. A tag housing is mounted to the base. A tag is positioned within the tag housing. The tag is operable to transmit one or more signals to a tag reader. The unit load device tracking tag also includes features for locking the base to the aircraft seat track such that the plurality of studs of the base do not slide within the aircraft seat track. Additional aspects and advantages of the invention will be set forth in part in the following description, or may be apparent from the description, or may be learned through practice of the invention.

In a first example embodiment, a unit load device tracking tag includes a base with a plurality of studs. The plurality of studs of the base is configured such that the plurality of studs of the base is receivable within an aircraft seat track. A tag housing is mounted to the base such that the tag housing is translatable relative to the base between an extended position and a retracted position. The tag housing has a plurality of studs. The plurality of studs of the tag housing is configured such that each stud of the plurality of studs of the tag housing is received within a respective mounting seat hole of the aircraft seat track in the extended position. A tag is positioned within the tag housing. The tag is operable to transmit one or more signals to a tag reader.

In a second example embodiment, a unit load device tracking tag includes a metal base having a plurality of studs. The plurality of studs of the metal base is configured such that the plurality of studs of the metal base is receivable within an aircraft seat track. The plurality of studs of the metal base conforms to MS33601. A plastic tag housing is mounted to the metal base such that the plastic tag housing is translatable relative to the metal base between an extended position and a retracted position. The plastic tag housing has a plurality of studs. The plurality of studs of the plastic tag housing is configured such that each stud of the plurality of studs of the plastic tag housing is received within a respective mounting seat hole of the aircraft seat track in the extended position. A tag is positioned within the plastic tag housing. The tag is operable to transmit one or more signals to a tag reader.

In a third example embodiment, a unit load device tracking tag includes a base having a plurality of studs. The plurality of studs of the base is configured such that the plurality of studs of the base is receivable within an aircraft seat track. A tag housing is mounted to the base. A tag is positioned within the tag housing. The tag is operable to transmit one or more signals to a tag reader. The unit load device tracking tag also includes features for selectively locking the base to the aircraft seat track such that the base and the tag housing do not slide relative to the aircraft seat track.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

FIG. 1 is a perspective view of a unit load device (ULD) tracking tag according to an example embodiment of the present subject matter.

FIG. 2 is an exploded view of the example ULD tracking tag of FIG. 1.

FIG. 3 is a side elevation view of the example ULD tracking tag of FIG. 1 with a tag housing of the example ULD tracking tag shown in an extended position.

FIG. 4 is a side elevation view of the example ULD tracking tag of FIG. 1 with the tag housing shown in a retracted position.

FIG. 5 is a section view of the example ULD tracking tag of FIG. 3.

FIG. 6 is a perspective view of the example ULD tracking tag of FIG. 1 mounted to a pallet.

FIG. 7 is a perspective view of a base of the example ULD tracking tag of FIG. 1.

FIG. 8 is a perspective view of a tag housing of the example ULD tracking tag of FIG. 1.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 is a perspective view of a unit load device (ULD) tracking tag 100 according to an example embodiment of the present subject matter. FIG. 2 is an exploded view of tracking tag 100. As discussed in greater detail below, tracking tag 100 may be mounted to a ULD, e.g., a pallet 10, in order to assist with tracking the ULD. Thus, e.g., during loading of an aircraft, tracking tag 100 may be scanned to assist with formulating a cargo manifesto for the aircraft. As another example, tracking tag 100 may be scanned at a destination to assist with insuring proper transfer of the ULD. It will be understood that the examples provided above are not provided to limit the present subject matter. Tracking tag 100 may be mounted to any suitable ULD to assist with tracking the ULD.

As may be seen in FIGS. 1 and 2, tracking tag 100 includes a base 110, a tag housing 120 and a tag 130. Tag 130 is positioned within tag housing 120. Tag housing 120 may cover tag 130 in order to limit or prevent damage to tag 130, e.g., due to physical impacts or compression. Tag 130 is operable to transmit one or more signals to a tag reader (not shown). Thus, e.g., a cargo handler may scan tag 130 with the tag reader to assist tracking a ULD on which tracking tag 100 is mounted.

Tag 130 may wirelessly communicate with the tag reader utilizing any suitable protocol. For example, tag 130 and the tag reader may wirelessly communicate with a Bluetooth® protocol. By communicating wirelessly with the tag reader, e.g., through tag housing 120, tag 130 may be completely encased or surrounded by tag housing 120 and base 110. In such a manner, durability of tag 130 may be advantageously increased relative to tags that communicate over a wired connection.

Base 110 and tag housing 120 cooperate to selectively mount tracking tag 100 to an aircraft seat track 50. Thus, tracking tag 100 may be conveniently mounted to an existing ULD component, i.e., aircraft seat track 50. In particular, tracking tag 100 may be mounted to a ULD more quickly and with less labor than known tracking tags that are fastened to ULDs. As shown in FIG. 6, aircraft seat track 50 may be mounted to or integrated into a pallet 10. It will be understood that aircraft seat track 50 may be mounted to any other suitable ULD in alternative example embodiments.

Aircraft seat track 50 is known and may also be referred to as "Boeing," "Brownline" or "Douglas" style track. Thus, aircraft seat track 50 is not be described in great detail herein. However, as may be seen in FIGS. 2 and 6, aircraft seat track 50 includes an extruded aluminum body 52. Aluminum body 52 defines an elongated slot 54, e.g., that extends along a length of aircraft seat track 50. Aluminum body 52 also defines a plurality of holes 56, e.g., machined holes. Holes 56 are positioned at and/or contiguous with elongated slot 54. In addition, holes 56 are uniformly distributed along a length of elongated slot 54. Holes 56 may be circular, and a diameter of holes 56 may be 0.785 inch in certain example embodiments. The diameter of holes 56 may also be greater than a width of elongated slot 54 between adjacent holes 56. Aluminum body 52 may further define an elongated subslot 58 below elongated slot 54 and holes 56. A width of elongated subslot 58 may be greater than the width of elongated slot 54 and the diameter of holes 56.

Various features of tracking tag 100 allow tracking tag 100 to be mounted (e.g., clipped) to aircraft seat track 50. Such features of tracking tag 100 are discussed in greater detail below in the context of FIGS. 2 through 8. Utilizing such components, tracking tag 100 may be conveniently mounted to aircraft seat track 50 faster than known tags that are fastened to pallet 10.

As shown in FIGS. 2, 3 and 7, base 110 has a plurality of studs 112. Studs 112 of base 110 are configured such that studs 112 of base 110 are receivable within aircraft seat track 50. To insert studs 112 of base 110 into aircraft seat track 50, an installer may align studs 112 of base 110 with holes 56 of aircraft seat track 50, and the installer may then insert studs 112 of base 110 through holes 56 until studs 112 of base 110 are positioned within subslot 58 of aircraft seat track 50.

In certain example embodiments, studs 112 of base 110 may form a double stud fitting that is receivable within aircraft seat track 50. In particular, studs 112 of base 110 may be configured to conform with MS33601, which is a standard aircraft specification for seat track used to secure cargo and interior assemblies. Aircraft seat track 50 may also conform with MS33601.

Referring now to FIG. 7, studs 112 of base 110 may include one circular stud 113 and two semicircular studs 114. Circular stud 113 may be positioned between two semicircular studs 114 on base 110. It will be understood that the configuration of studs 112 of base 110 shown in FIG. 7 is provided by way of example only. In alternative example embodiments, studs 112 of base 110 may include: (1) two or more circular stud 113 and no semicircular studs 114; (2) no circular stud 113 and two or more semicircular studs 114; or (3) two or more circular stud 113 and two or more semicircular studs 114. Other configurations of studs 112 of base 110 are also within the scope of the present subject matter.

As shown in FIGS. 2, 3 and 8, tag housing 120 is mounted to base 110. In particular, tag housing 120 may be mounted to base 110 such that tag housing 120 is translatable relative to base 110 between an extended position (FIG. 3) and a retracted position (FIG. 4). For example, base 110 may slide within a slot 124 defined by tag housing 120 between the extended and retracted positions. Tag housing 120 has a plurality of studs 122. Studs 122 of tag housing 120 are configured such that each of the studs 122 of tag housing 120 is received within a respective hole 56 of aircraft seat track 50 in the extended position.

By adjusting between the extended position and the retracted position, tag housing 120 cooperates with base 110 to mount tracking tag 100 to aircraft seat track 50. For example, as noted above, an installer may align studs 112 of base 110 with holes 56 of aircraft seat track 50, and the installer may then insert studs 112 of base 110 through holes 56 until studs 112 of base 110 are positioned within subslot 58 of aircraft seat track 50. Once inserted through holes 56 into subslot 58, studs 112 of base 110 may slide within subslot 58 of aircraft seat track 50. In particular, the installer may slide studs 112 of base 110 within subslot 58 until studs 112 of base 110 are offset from and positioned between holes 56. The installer may also align studs 122 of tag housing 120 with holes 56 of aircraft seat track 50, and the installer may then shift tag housing 120 from the retracted position into the extended position.

By shifting tag housing 120 from the retracted position into the extended position, the installer may insert studs 122 of tag housing 120 into holes 56 of aircraft seat track 50. With studs 122 of tag housing 120 positioned within holes 56 and studs 112 of base 110 positioned within subslot 58, tracking tag 100 is mounted to aircraft seat track 50 as shown in FIG. 6. Tracking tag 100 may not move relative to aircraft seat track 50 until tag housing 120 is adjusted to the retracted position.

The above described process for mounting tracking tag 100 to aircraft seat track 50 may be reversed to dismount tracking tag 100 from aircraft seat track 50. By shifting tag housing 120 between the extended and retracted positions on aircraft seat track 50, tracking tag 100 may be selectively or removably mounted to aircraft seat track 50. In addition, tracking tag 100 may be advantageously mounted to pallet 10 more quickly and with less labor than known tracking tags that are fastened to pallet 10.

FIG. 7 is a perspective view of base 110 of tracking tag 100. As shown in FIG. 7, base 110 comprises a pair of end walls 116. Each end wall 116 is positioned at a respective end of base 110. Thus, end walls 116 may be positioned at opposite ends of base 110. Studs 112 of base 110 may be positioned between end walls 116. In addition, as shown in FIG. 1, tag housing 120 may be positioned between end walls 116 of base 110. End walls 116 of base 110 may advantageously limit or prevent damage to tag housing 120, e.g., due to cargo on pallet 10 impacting tracking tag 100.

FIG. 8 is a perspective view of tag housing 120. As shown in FIGS. 2 and 8, studs 122 of tag housing 120 may include two studs. Each of the two studs 122 of tag housing 120 may be positioned at a respective end wall 116 of base 110. In addition, studs 112 of base 110 may be positioned between the two studs 122 of tag housing 120.

Base 110 and tag housing 120 may be constructed of different materials in certain example embodiments. For example, base 110 may be constructed of or with a metal, such as steel. In contrast, tag housing 120 may be constructed of or with a plastic, such as acrylonitrile butadiene styrene. As an example, base 110 may be a forged steel base such that studs 112 and end wall 116 of base 110 are formed from a single, continuous piece of forged steel. In such a manner, base 110 may advantageously provide a durable fitting for mounting tracking tag 100 to aircraft seat track 50. As another example, tag housing 120 may be formed from injection molded plastic such that studs 122 of tag housing 120 are formed from a single, continuous piece of molded plastic. In such a manner, tag housing 120 may advantageously protect tag 130 while also allowing signal communication with a tag reader through tag housing 120. Other materials and formation methods for base 110 and tag housing 120 are within the scope of the present subject matter.

Tag housing 120 may be mounted to base 110 in any suitable manner such that tag housing 120 is movable relative to base 110 between the extended and retracted positions. For example, as shown in FIG. 5, tracking tag 100 may include a plurality of mounting pins 140. In addition, base 110 may define a pair of mounting holes 118. Each mounting hole 118 may be positioned at a respective end of base 110, e.g., between end walls 116. Mounting pins 140 are mounted to tag housing 120 such that a respective mounting pin 140 extends through each mounting hole 118. Mounting pins 140 may move within mounting holes 118 of base 110 to guide motion of tag housing 120 between the extended and retracted positions while also preventing removal of tag housing 120 from base 110. For example, mounting pins 140 may be positioned at a bottom of mounting holes 118 when tag housing 120 is in the extended position as shown in FIG. 5 such that mounting pins 140 impact against the bottom of mounting holes 118 when tag housing 120 attempts to shift past the extended position. Conversely, mounting pins 140 may be positioned at a top of mounting holes 118 when tag housing 120 is in the retracted position such that mounting pins 140 impact against the top of mounting holes 118 when tag housing 120 attempts to shift past the retracted position. Thus, mounting pins 140 within mounting holes 118 may constrain translation of tag housing 120 relative to base 110 to between the extended and retracted positions.

Tracking tag 100 may also include a plurality of locking pins 150. Locking pins 150 may secure tag housing 110 in the extended position. For example, base 110 may define a pair of locking holes 119. Each locking hole 119 may be positioned at a respective end of base 110, e.g., between end walls 116. Each locking hole 119 may also be contiguous with a respective mounting hole 118 as shown in FIG. 7. Locking pins 140 are mounted to tag housing 120 such that a respective locking pin 150 extends through each locking hole 119. An installer may insert locking pins 150 through tag housing 120 and locking holes 119 after mounting tracking tag 100 to aircraft seat track 50 by inserting studs 122 of tag housing 120 into holes 56 of aircraft seat track 50 in the manner described above. Locking pins 150 and locking holes 119 may be sized such that locking pins 150 within locking holes 119 block translation of tag housing 120 from extended position into the retracted position. For example, locking pins 150 may be positioned at a top of locking holes 119 when tag housing 120 is in the extended position as shown in FIG. 5 such that locking pins 150 impact against the top of locking holes 119 when tag housing 120 attempts shift from the extended position to the retracted position. In such a manner, undesired removal of tracking tag 100 from aircraft seat track 50 may be prevented.

It will be understood that FIG. 5 shows both mounting pins 140 and locking pins 150 mounted to tag housing 120. Thus, e.g., tag housing 120 is locked in the extended position, e.g., and mounted to aircraft seat track 50, in FIG. 5. To allow installation of tag housing 120 onto aircraft seat track 50, locking pins 150 are not mounted to tag housing 120 until after tracking tag 100 is mounted to aircraft seat track 50 in the manner described above. The installer may then insert locking pins 150 through tag housing 120 and locking holes 119 to lock tag housing 120 in the extended position and prevent undesired removal of tracking tag 100 from aircraft seat track 50. Locking pins 150 may be removed from tag housing 120 to allow removal of tracking tag 100 from aircraft seat track 50.

The example embodiment shown in FIGS. 1 through 8 is provided by way of example only. Thus, other arrangements of the components described above are within the scope of the present subject matter. As an example, studs 122 may be separate from tag housing 120 in alternative example embodiments, and tag 120 may be positioned within tag housing 120 while studs 122 shift separate from tag housing 120 between extended and retracted positions. Thus, the components of tracking tag 100 that lock tracking tag 100 to aircraft seat track 50 may be separated from the components of tracking tag 100 that house tag 130 in certain example embodiments.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A unit load device tracking tag, comprising:
   a base having a plurality of studs, the plurality of studs of the base configured such that the plurality of studs of the base is receivable within an aircraft seat track;

a tag housing mounted to the base such that the tag housing is translatable relative to the base between an extended position and a retracted position, the tag housing having a plurality of studs, the plurality of studs of the tag housing configured such that each stud of the plurality of studs of the tag housing is received within a respective mounting seat hole of the aircraft seat track in the extended position; and a tag positioned within the tag housing, the tag operable to transmit one or more signals to a tag reader.

2. The air cargo pallet tag of claim 1, wherein the plurality of studs of the base is configured to conform to MS33601.

3. The unit load device tracking tag of claim 1, wherein the plurality of studs of the base comprises one circular stud and two semicircular studs.

4. The unit load device tracking tag of claim 1, wherein the base comprises a pair of end walls, each end wall of the pair of end walls positioned at a respective end of the base, the tag housing positioned between the pair of end walls.

5. The unit load device tracking tag of claim 4, wherein the plurality of studs of the tag housing comprises two studs, each of the two studs of the tag housing positioned at a respective one of the end wall of the pair of end walls.

6. The unit load device tracking tag of claim 4, wherein the plurality of studs of the base are positioned between the two studs of the tag housing.

7. The unit load device tracking tag of claim 1, wherein the base is a metal base, and the tag housing is a plastic tag housing.

8. The unit load device tracking tag of claim 7, wherein the metal base is a forged steel base, and the plastic tag housing is a acrylonitrile butadiene styrene tag housing.

9. The unit load device tracking tag of claim 1, further comprising a plurality of mounting pins, the base defining a pair of mounting holes, each mounting hole of the pair of mounting holes positioned at a respective end of the base, each of the plurality of mounting pins mounted to the tag housing and extending through a respective mounting hole of the pair of mounting holes.

10. The unit load device tracking tag of claim 9, wherein the plurality of mounting pins within the pair of mounting holes constrains translation of the tag housing relative to the base to between the extended position and the retracted position.

11. The unit load device tracking tag of claim 9, further comprising a plurality of locking pins, the base defining a pair of locking holes, each locking hole of the pair of locking holes positioned at a respective end of the base, each of the plurality of locking pins mounted to the tag housing and extending through a respective locking hole of the pair of locking holes when the tag housing is in the extended position such that the plurality of locking pins within the pair of locking holes block translation of the tag housing from the extended position.

12. A unit load device tracking tag, comprising:

a metal base having a plurality of studs, the plurality of studs of the metal base configured such that the plurality of studs of the metal base is receivable within an aircraft seat track, the plurality of studs of the metal base conforming to MS33601;

a plastic tag housing mounted to the metal base such that the plastic tag housing is translatable relative to the metal base between an extended position and a retracted position, the plastic tag housing having a plurality of studs, the plurality of studs of the plastic tag housing configured such that each stud of the plurality of studs of the plastic tag housing is received within a respective mounting seat hole of the aircraft seat track in the extended position; and a tag positioned within the plastic tag housing, the tag operable to transmit one or more signals to a tag reader.

13. The unit load device tracking tag of claim 12, wherein the metal base comprises a pair of end walls, each end wall of the pair of end walls positioned at a respective end of the metal base, the plastic tag housing positioned between the pair of end walls.

14. The unit load device tracking tag of claim 13, wherein the plurality of studs of the plastic tag housing comprises two studs, each of the two studs of the plastic tag housing positioned at a respective one of the end wall of the pair of end walls.

15. The unit load device tracking tag of claim 14, wherein the plurality of studs of the metal base are positioned between the two studs of the plastic tag housing.

16. The unit load device tracking tag of claim 12, further comprising a plurality of mounting pins, the metal base defining a pair of mounting holes, each mounting hole of the pair of mounting holes positioned at a respective end of the metal base, each of the plurality of mounting pins mounted to the tag housing and extending through a respective mounting hole of the pair of mounting holes.

17. The unit load device tracking tag of claim 16, wherein the plurality of mounting pins within the pair of mounting holes constrains translation of the plastic tag housing relative to the metal base to between the extended position and the retracted position.

18. The unit load device tracking tag of claim 16, further comprising a plurality of locking pins, the metal base defining a pair of locking holes, each locking hole of the pair of locking holes positioned at a respective end of the metal base, each of the plurality of locking pins mounted to the tag housing and extending through a respective locking hole of the pair of locking holes when the plastic tag housing is in the extended position such that the plurality of locking pins within the pair of locking holes block translation of the plastic tag housing from the extended position.

* * * * *